(12) United States Patent
Wu et al.

(10) Patent No.: US 8,245,387 B2
(45) Date of Patent: Aug. 21, 2012

(54) DISASSEMBLING DEVICE

(75) Inventors: Chong-Wei Wu, New Taipei (TW);
Jui-Yung Kao, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/223,271

(22) Filed: Aug. 31, 2011

(65) Prior Publication Data
US 2012/0060363 A1 Mar. 15, 2012

(30) Foreign Application Priority Data
Sep. 10, 2010 (TW) .............................. 99130602 A

(51) Int. Cl.
*H05K 5/02* (2006.01)

(52) U.S. Cl. ........ 29/763; 361/679.58; 429/96; 429/100

(58) Field of Classification Search .................... 29/763; 312/223.2; 361/679.55, 679.58; 429/96, 429/97, 100
See application file for complete search history.

(56) References Cited

U.S. PATENT DOCUMENTS

| | | | | |
|---|---|---|---|---|
| 5,225,293 A | * | 7/1993 | Mitchell et al. | 429/97 |
| 5,649,750 A | * | 7/1997 | Ishii et al. | 312/223.2 |
| 5,740,012 A | * | 4/1998 | Choi | 361/679.39 |
| 5,971,780 A | * | 10/1999 | Youn | 439/160 |

* cited by examiner

*Primary Examiner* — Livius R Cazan

(57) ABSTRACT

A disassembling device includes a housing, a rotating element and a battery module. The housing includes a first engaging portion. The rotating element is rotatably disposed on the housing. The battery module, disposed in the housing in a detachable manner, includes a second engaging portion engaging with the first engaging portion. The rotating element rotates to push the first engaging portion, enabling the first engaging portion is enabled to detach from the second engaging portion.

17 Claims, 7 Drawing Sheets

DISASSEMBLING DEVICE

CROSS REFERENCE TO RELATED APPLICATIONS

This Application claims priority of Taiwan Patent Application No. 099130602, filed on Sep. 10, 2010, the entirety of which is incorporated by reference herein.

BACKGROUND OF THE INVENTION

1. Field of the Invention

The present invention relates to a disassembling device, and in particular relates to a disassembling device including a hidden rotating switch for a battery.

2. Description of the Related Art

Referring to FIG. 1, FIG. 1 is a schematic view of a bottom of a conventional disassembling device 10. In the conventional disassembling device 10 applied to a portable computer, a battery module 12 is usually installed at one side of a housing 11, and an engaging structure, disposed inside the housing 11, is engaged with the battery module 12, so as to fix the battery module 12 in the housing 11. When detaching the battery module 12, a user manually moves the buttons 13, connected to the engaging structure installed inside of the housing 11, so as to make the engaging structure detach from the battery module 12, to withdraw the battery module 12. However, the button 13 is exposed on the outside of the housing 11 resulting in an unappealing aesthetic look.

BRIEF SUMMARY OF THE INVENTION

A disassembling device includes a housing, a rotating element and a battery module. The housing includes a first engaging portion. The rotating element is rotatably disposed on the housing. The battery module, disposed in the housing in a detachable manner, includes a second engaging portion engaging with the first engaging portion. The rotating element rotates to push the first engaging portion, enabling the first engaging portion to detach from the second engaging portion.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is one of the embodiments of the invention. This description is made for the purpose of illustrating the general principles of the invention and should not be taken in a limiting sense. The scope of the invention is best determined by reference to the appended claims.

Figure 1:
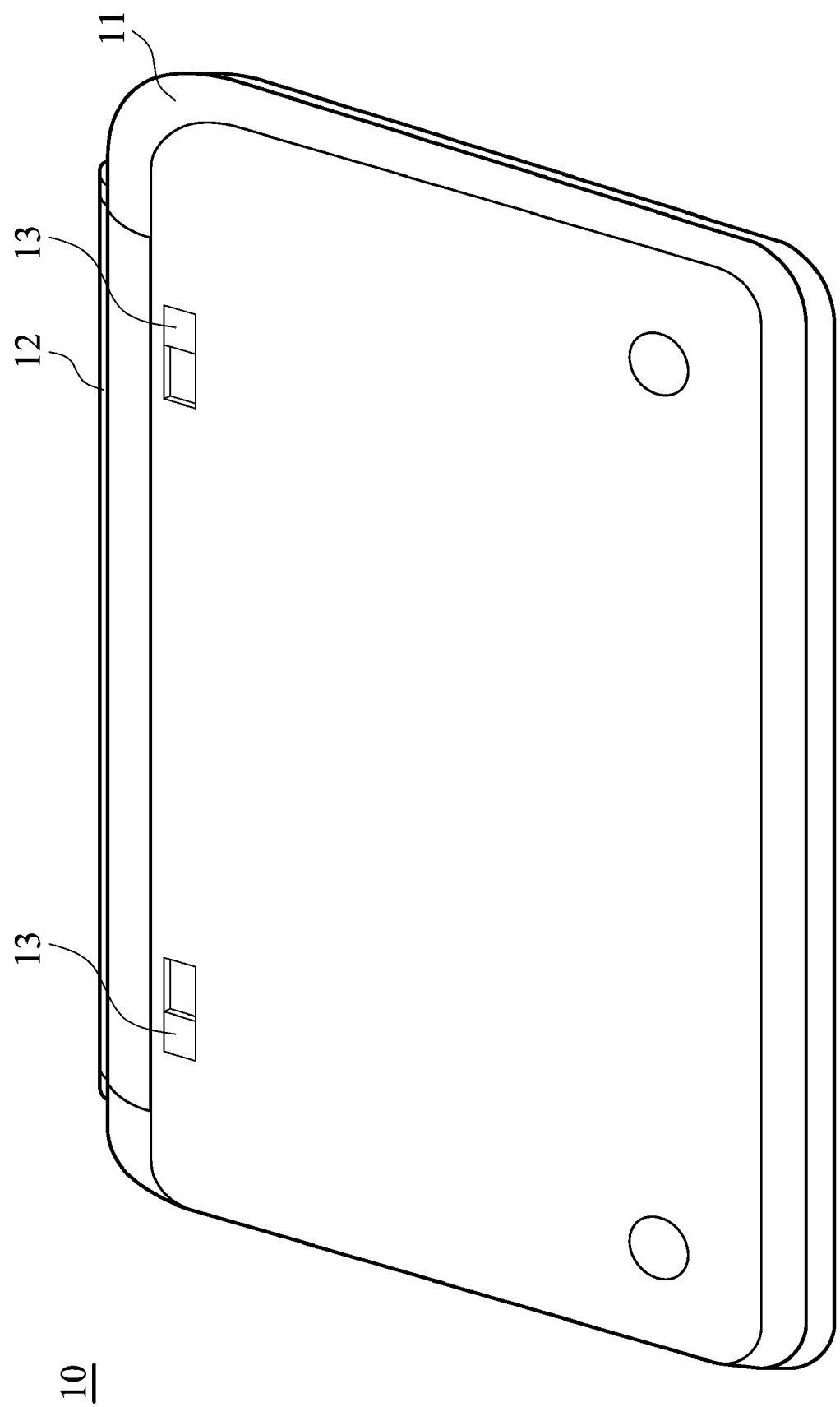
FIG. 1 is a schematic bottom view of a conventional disassembling device 10.
Figure 2:
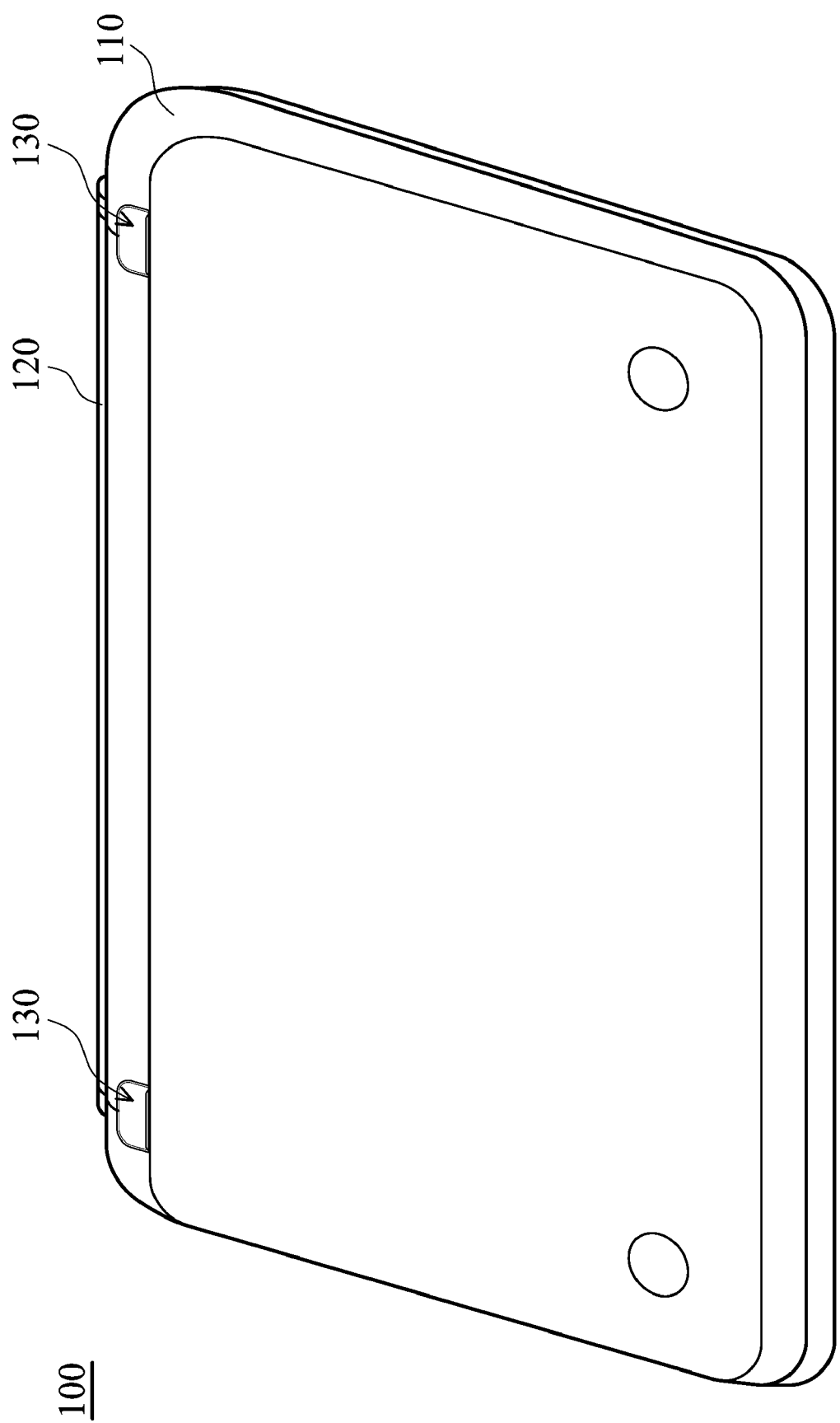
FIG. 2 is a schematic bottom view showing a disassembling device of the present invention.
Figure 3A:
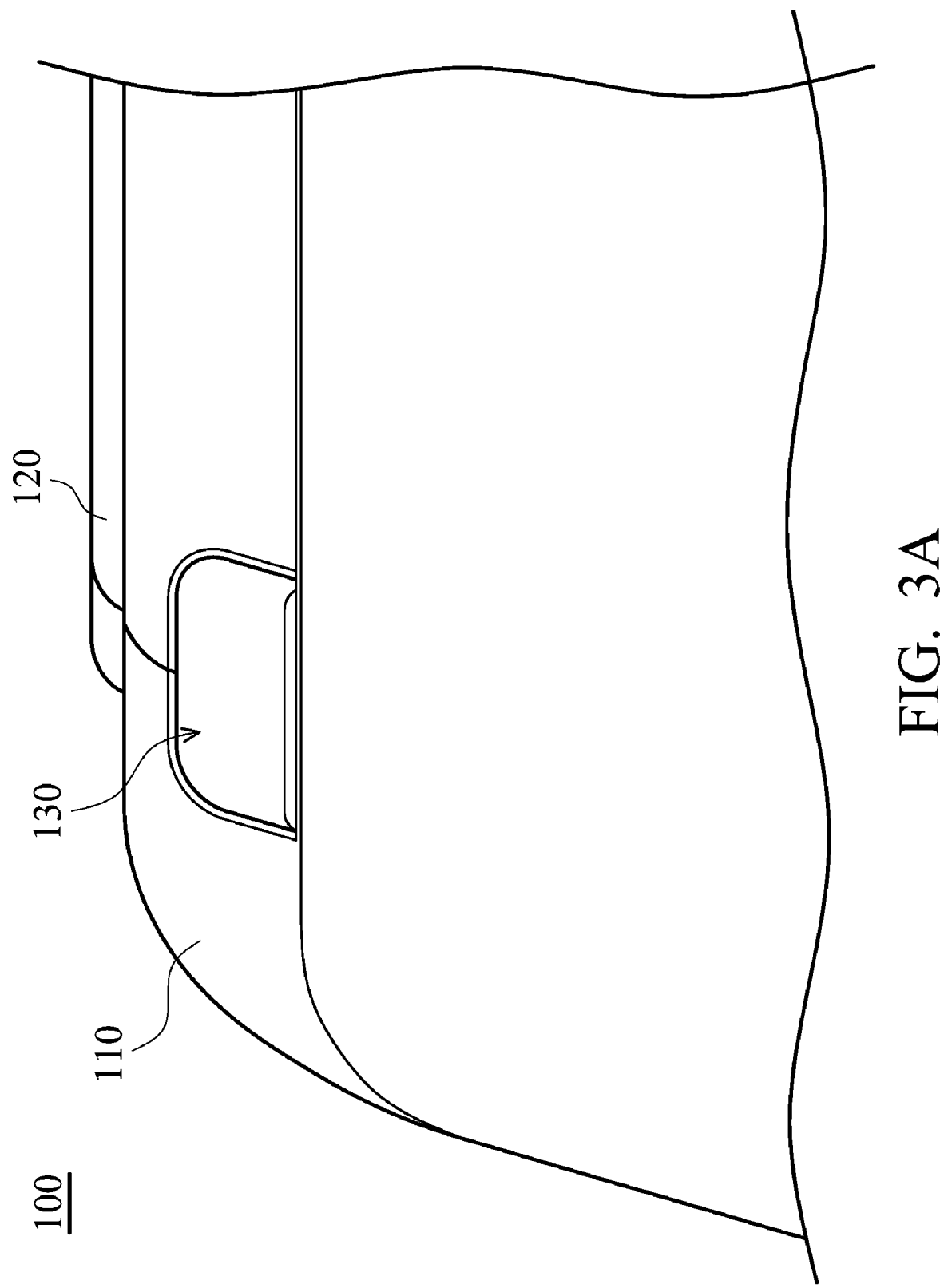
FIGS. 3A and 3B show partially enlarged views of the disassembling device in FIG. 2.
Figure 3B:
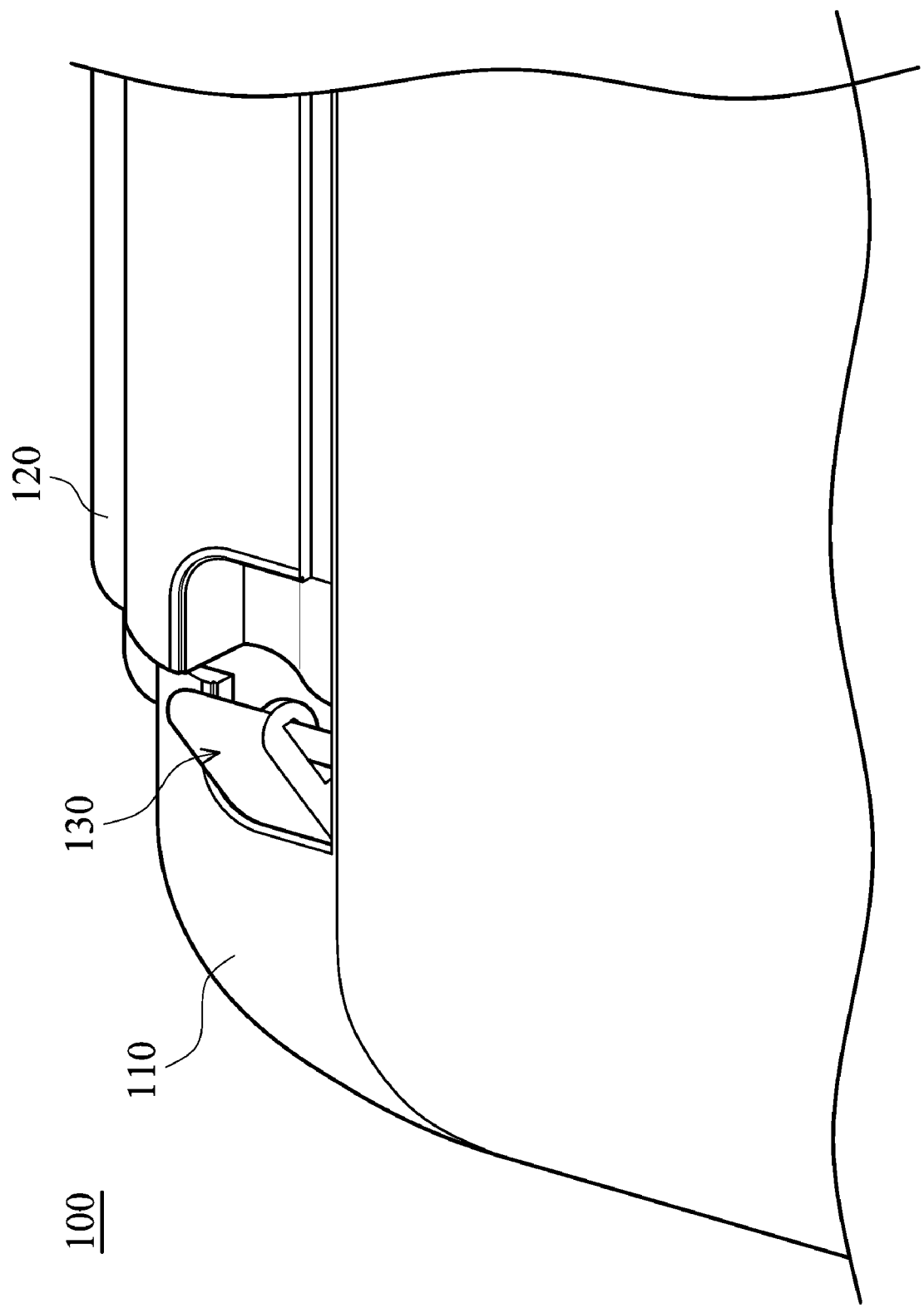

FIG. 2 is a schematic bottom view showing a disassembling device of the present invention, FIGS. 3A and 3B show partially enlarged views of the disassembling device in FIG. 2. A disassembling device 100 of the present invention can be applied to a portable computer, and the disassembling device 100 includes a housing 110, a battery module 120, and a rotating element 130, wherein the battery module 120 is disposed in the housing 110 in a detachable manner, so that a user can detach the battery module 120 from the housing 110 by merely rotating the rotating element 130 (as shown in FIGS. 3A and 3B). In this embodiment, the rotating element 130 is a baffle pad, so that when the disassembling device 100 is placed on a plane, the baffle pad prevents a surface of the disassembling device 100 from being damaged. In other words, the disassembling device 100 utilizes the baffle pad, i.e. rotating element 130, as a detaching button, wherein a surface of the baffle pad is aligned with the housing 110 to hide the detaching button, which overcomes the unappealing structural issue found in the art.

Figure 4A:
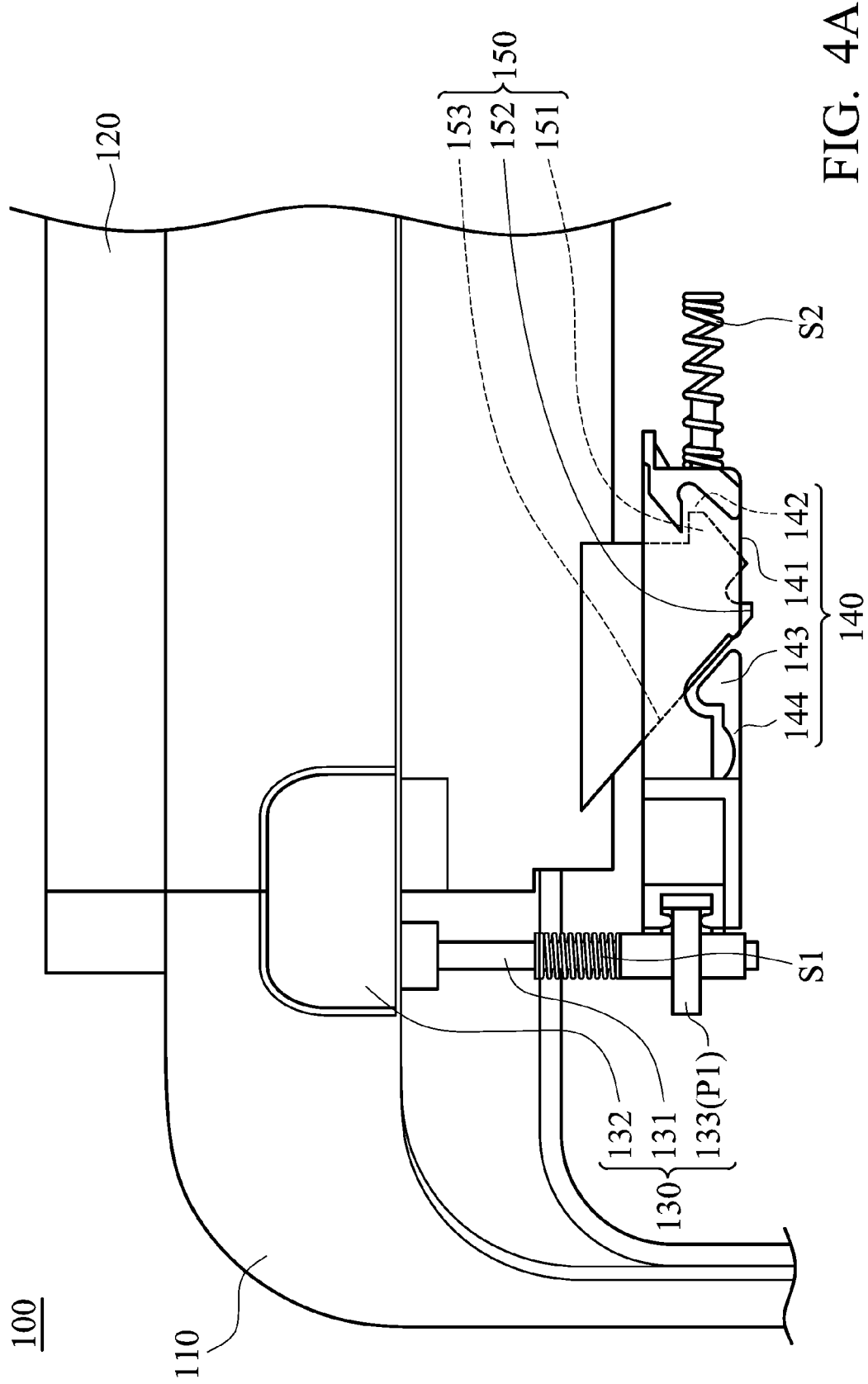
FIGS. 4A and 4B show partially schematic views of an inner structure of the disassembling device of the present invention.
Figure 4B:
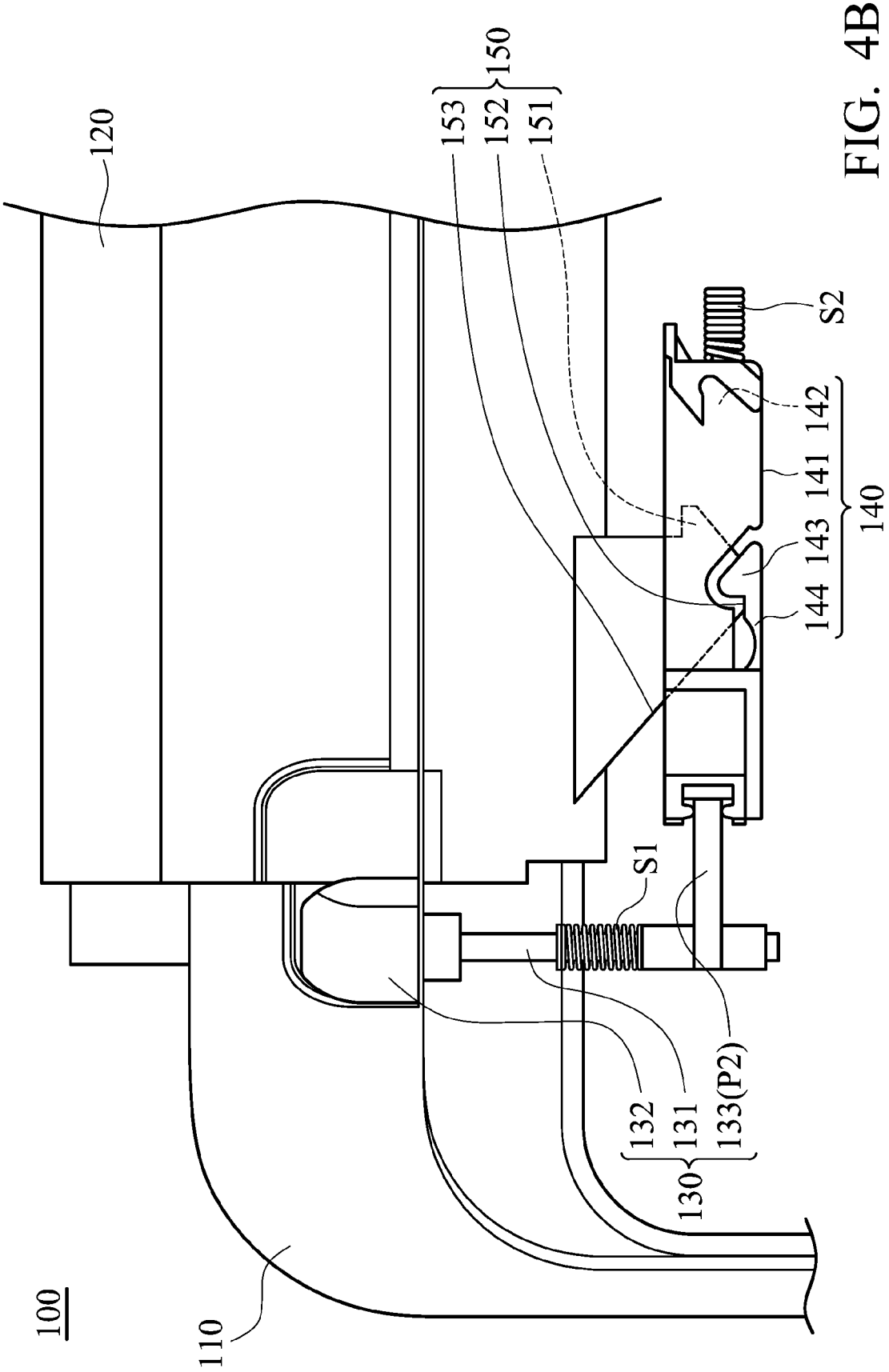

FIGS. 4A and 4B show partially schematic views of an inner structure of the disassembling device of the present invention, wherein the rotating element 130 includes a rod 131, a rotating body 132, a pin 133, and a first flexible part S1. The rod 131 is rotatably disposed in the housing 110, and the rotating body 132 is connected to the rod 131 and exposed outside of the housing 110. After rotating the rotating body 132, the rod 131 is triggered to rotate and enabling the pin 133, connected to the rod 131, to be rotated between a first position P1 (as shown in FIG. 4A) and a second position P2 (as shown in FIG. 4B). Additionally, the first flexible part S1 is disposed on the rod 131, and when the rod 131 is rotated to the second position P2 from the first position P1, the first flexible part S1 is compressed, resulting a restoring force actuating the rod 131 to reversely rotate to the first position P1 from the second position P2.

The housing 110 includes a first engaging portion 140. The first engaging portion 140 includes a body 141, a catch interlocker 142, a first positioning portion 143 and a flexible arm 144. The body 141 of the first engaging portion 140 is abutted against the pin 133 of the rotating element 130, and the catch interlocker 142 is formed on the body 141. When the pin 133 is rotated to the second position P2 from the first position P1, the first engaging portion 140 is pushed, enabling the first positioning portion 143 to be connected to the body 141 by the flexible arm 144.

Figure 5:
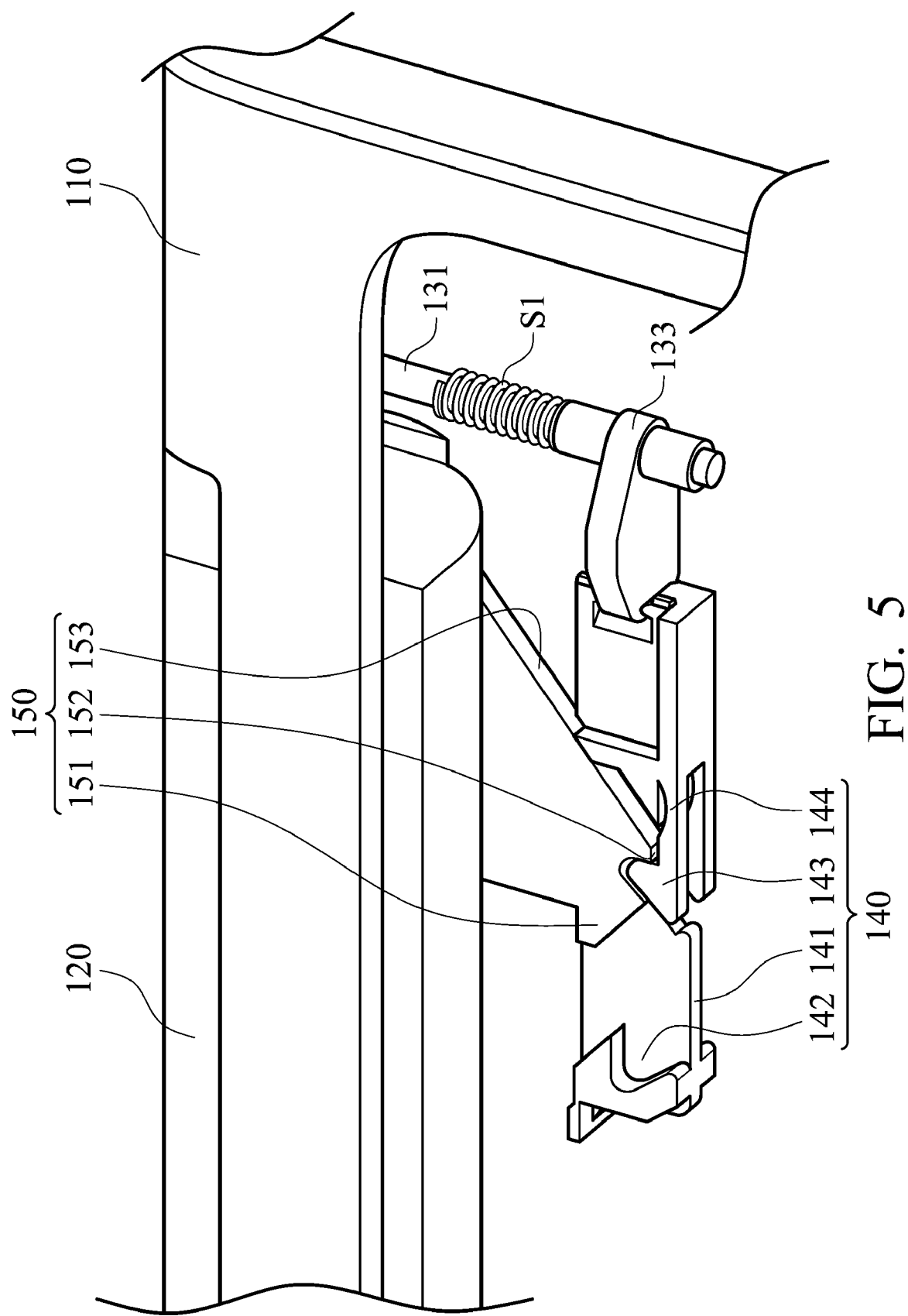
FIG. 5 shows a schematic view of the first engaging portion and the second engaging portion of the disassembling device of the present invention in an engaged state.

Referring to FIG. 5, FIGS. 4A and 4B. FIG. 5 shows a schematic view of the disassembling device of the present invention in a state when the first engaging portion 140 is engaged with a second engaging portion 150. The battery module 120 includes a second engaging portion 150. The second engaging portion 150 includes a hook 151, a second positioning portion 152, and a slant side 153. Wherein the battery module 120 is engaged with the housing 110 by an engagement between the first engaging portion 140 and the second engaging portion 150, as shown in FIG. 4A. Specifically, it is the hook 151 of the second engaging portion 150 interlocking the catch interlock 142 of the first engaging portion 140 that enables the battery module 120 to be fixed in the housing 110. Referring to FIG. 4B, when the pin 133 is rotated to the second position P2 from the first position P1, the first engaging portion 140 is pushed by the pin 133, resulting a movement of the first engaging portion 140, which pushes the second engaging portion 150 along the slant side 153, making the hook 151 detach from the catch interlock 142, while at the same time, the second engaging portion 150 is pushed away from the first engaging portion 140, making the battery module 120 detach from the housing 110. Also, after the hook 151 is detached from the catch interlock 142, due to an interlocking fit between the first positioning portion 143 and the second positioning portion 152, an engagement occurs therebetween, and the battery module 120 and the housing 110 are kept in a predetermined position, which prohibits the second engaging portion 150 from going back to a state of being engaged with the first engaging portion 140. Thus, a user can easily withdraw the battery module 120 from the housing 110.

It should be noted that, as shown in FIG. 5, a hollowing out structural design is applied between the body 141 and the flexible arm 144. When the slant side 153 of the second engaging portion 150 is abutted against the first positioning portion 143, by utilizing the restoring force of the flexible arm 144, a user can push the second engaging portion 150 with minimal force.

Additionally, the disassembling device 100 further includes a second flexible part S2, disposed in the housing 110 and abutted against the housing 110 and the body 141 of the first engaging portion 140, respectively. When the first engaging portion 140 is pushed by the rotating element 130, the second flexible part S2 is compressed by the first engaging portion 140 and provides a restoring force to the body 141, which enables the body 141 to be reversely moved to an original position.

While the invention has been described by way of example and in terms of embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A disassembling device, comprising:
a housing, comprising a first engaging portion;
a rotating element, rotatably disposed on the housing; and
a battery module, comprising a second engaging portion engaging with the first engaging portion, disposed in the housing in a detachable manner,
wherein when the rotating element rotates to push the first engaging portion, the first engaging portion is enabled to detach from the second engaging portion,
wherein the rotating element comprises:
a rod, rotatably disposed in the housing;
a rotating body, connected to the rod and exposed outside of the housing; and
a pin, connected to the rod and abutted against the first engaging portion, wherein when the rotating body triggers the rotation of the rod, the pin is able to rotate between a first position and a second position.

2. The disassembling device as claimed in claim 1, wherein when the pin rotates to the second position from the first position, the first engaging portion is enabled to be pushed, making the first engaging portion detach from the second engaging portion.

3. The disassembling device as claimed in claim 2, wherein the rotating element further comprises a first flexible part, disposed on the rod, wherein when the rod is rotated to the second position from the first position, the first flexible part is compressed so that a restoring force is provided to the rod.

4. The disassembling device as claimed in claim 3, wherein the rotating element comprises a baffle pad, and one of the surfaces of the baffle pad is aligned with the housing.

5. A disassembling device, comprising:
a housing, comprising a first engaging portion;
a rotating element, rotatably disposed on the housing; and
a battery module, comprising a second engaging portion engaging with the first engaging portion, disposed in the housing in a detachable manner,
wherein when the rotating element rotates to push the first engaging portion, the first engaging portion is enabled to detach from the second engaging portion,
wherein the first engaging portion comprises a body and a catch interlock formed on the body, and the second engaging portion has a hook, engaged with the catch interlock, and a slant side, wherein when the first engaging portion is pushed, the second engaging portion is pushed by the first engaging portion along the slant side, so as to detach the hook from the catch interlock.

6. The disassembling device as claimed in claim 5, wherein the first engaging portion further comprises a first positioning portion, connected to the body, and the second engaging portion comprises a second positioning portion, and wherein after the hook is detached from the catch interlock, due to an interlocking fit between the first positioning portion and the second positioning portion, the battery module and the housing are kept in a predetermined position.

7. The disassembling device as claimed in claim 6, wherein the first engaging portion further comprises a flexible arm connected to the body and the first positioning portion.

8. The disassembling device as claimed in claim 7, wherein a hollowing out structure is designed between the body and the flexible arm.

9. The disassembling device as claimed in claim 6 further comprising a second flexible part, disposed in the housing, abutted against the body and the housing, respectively, wherein when the first engaging portion is pushed, the second flexible part is compressed, providing a restoring force for the body.

10. A disassembling device, comprising:
a housing, comprising a first engaging portion;
a rotating element, rotatably disposed on the housing; and
a battery module, comprising a second engaging portion engaging with the first engaging portion, disposed in the housing in a detachable manner,
wherein when the rotating element rotates to push the first engaging portion, the first engaging portion is enabled to detach from the second engaging portion,
wherein the rotating element comprises:
a rod, rotatably disposed in the housing;
a rotating body, connected to the rod and exposed outside of the housing; and
a pin, connected to the rod and abutted against the first engaging portion, wherein when the rotating body triggers the rotation of the rod, the pin is able to rotate between a first position and a second position,
wherein the first engaging portion comprises a body and a catch interlock formed on the body, and the second engaging portion has a hook, engaged with the catch interlock, and a slant side, wherein when the first engaging portion is pushed, the second engaging portion is pushed by the first engaging portion along the slant side, so as to detach the hook from the catch interlock.

11. The disassembling device as claimed in claim 10, wherein when the pin rotates to the second position from the first position, the first engaging portion is enabled to be pushed, making the first engaging portion detach from the second engaging portion.

12. The disassembling device as claimed in claim 11, wherein the rotating element further comprises a first flexible part, disposed on the rod, wherein when the rod is rotated to the second position from the first position, the first flexible part is compressed so that a restoring force is provided to the rod.

13. The disassembling device as claimed in claim 12, wherein the rotating element comprises a baffle pad, and one of the surfaces of the baffle pad is aligned with the housing.

14. The disassembling device as claimed in claim 10, wherein the first engaging portion further comprises a first positioning portion, connected to the body, and the second engaging portion comprises a second positioning portion, and wherein after the hook is detached from the catch interlock, due to an interlocking fit between the first positioning portion and the second positioning portion, the battery module and the housing are kept in a predetermined position.

15. The disassembling device as claimed in claim 14, wherein the first engaging portion further comprises a flexible arm connected to the body and the first positioning portion.

16. The disassembling device as claimed in claim 15, wherein a hollowing out structure is designed between the body and the flexible arm.

17. The disassembling device as claimed in claim 14 further comprising a second flexible part, disposed in the housing, abutted against the body and the housing, respectively, wherein when the first engaging portion is pushed, the second flexible part is compressed, providing a restoring force for the body.

* * * * *

UNITED STATES PATENT AND TRADEMARK OFFICE
CERTIFICATE OF CORRECTION

PATENT NO. : 8,245,387 B2  
APPLICATION NO. : 13/223271  
DATED : August 21, 2012  
INVENTOR(S) : Chong-Wei Wu and Jui-Yung Kao Page 1 of 1

It is certified that error appears in the above-identified patent and that said Letters Patent is hereby corrected as shown below:

On the Title page, Item (75) Inventors should read:

Chong-Wei Wu, New Taipei City  
Jui-Yung Kao, New Taipei City

Signed and Sealed this  
Twenty-third Day of October, 2012

David J. Kappos  
*Director of the United States Patent and Trademark Office*